United States Patent [19]

Aoyama et al.

[11] Patent Number: 5,674,313
[45] Date of Patent: Oct. 7, 1997

[54] RUBBER MODIFIED ASPHALT TYPE OF WATER-PROOFING COMPOSITION

[75] Inventors: Tsuyoshi Aoyama; Yoshimasa Hayashi, both of Tokyo; Tadashi Nouchi; Kazuhiko Shichiku, both of Nigata; Akira Ito; Hiroyuki Ishii, both of Tochigi; Haruka Ogawa, Tokyo; Hitofusa Mitani, Tokyo; Kiyoshige Nishibayashi, Tokyo, all of Japan

[73] Assignees: Obayashi Corporation, Osaka; Toho Natural Gas Company, Limited, Nigata; Nichireki Co., Ltd., Tokyo, all of Japan

[21] Appl. No.: 718,128

[22] Filed: Sep. 18, 1996

Related U.S. Application Data

[63] Continuation of Ser. No. 313,807, Sep. 28, 1994, abandoned.

[30] Foreign Application Priority Data

Sep. 29, 1993 [JP] Japan ................................. 5-274727

[51] Int. Cl.$^6$ ........................................................ C08L 95/00
[52] U.S. Cl. ............................... 106/2; 106/10; 106/277; 106/DIG. 7
[58] Field of Search ........................... 106/277, 671, 106/668, 696, 724, DIG. 7, 2, 10

[56] References Cited

U.S. PATENT DOCUMENTS

| | | | |
|---|---|---|---|
| 2,377,491 | 6/1945 | Goodrich et al. | 106/671 |
| 3,932,331 | 1/1976 | Doi et al. | 106/278 |
| 4,053,401 | 10/1977 | Fuskushima et al. | 210/52 |
| 4,060,425 | 11/1977 | Harada et al. | 106/671 |
| 4,287,242 | 9/1981 | Monden et al. | 427/426 |

FOREIGN PATENT DOCUMENTS

| | | |
|---|---|---|
| 56-48652 | 11/1981 | Japan. |
| 58-41107 | 9/1983 | Japan. |
| 0206655 | 8/1990 | Japan. |

*Primary Examiner*—Paul Marcantoni
*Attorney, Agent, or Firm*—Browdy and Neimark

[57] ABSTRACT

An object of the invention is to provide a rubber modified asphalt type of waterproofing composition which can be used in a normal temperature type of spray waterproofing method and can find its application in waterproofing, moisture-proofing, rustproofing, and filling buildings and structure for engineering works, said waterproofing composition coagulates instantaneously to form a stable yet firm waterproofing layer. This rubber modified asphalt type of waterproofing composition comprises a cationic rubber modified asphalt emulsion and an organic coagulating agent.

15 Claims, No Drawings

5,674,313

RUBBER MODIFIED ASPHALT TYPE OF WATER-PROOFING COMPOSITION

This application is a continuation of application Ser. No. 08/313,807, filed Sep. 28, 1994, now abandoned in favor of the present copending application.

FIELD OF THE INVENTION

The present invention relates to a rubber modified asphalt type of waterproofing composition. More specifically, the present invention is concerned with a rubber modified asphalt type of waterproof composition that is used for the purpose of shielding buildings and structures for engineering works against water, moisture and rust, or the filling of cavities or other purposes. Still more specifically, the present invention relates to a rubber modified asphalt type of waterproofing composition that can be so instantaneously coagulated by a normal temperature spray waterproofing method that it can form a stable yet tough waterproof layer.

BACKGROUND OF THE INVENTION

So far, Hotmelt Asphalt waterproofing methods have often been used for the purpose of making structures for engineering works and buildings waterproof. However, these methods have involved many problems such as foul odors and fuming, a possibility of catching fire, and a risk of causing workers to have burns, because asphalt is melted by heat for use on site.

In recent years, these methods have been superseded by normal temperature waterproofing methods using a rubber modified asphalt emulsion. One typical method involves spraying a mixture of a rubber modified asphalt emulsion and a gelatinizing agent onto an application surface to form thereon a rubber modified asphalt layer, and another method comprises injecting a rubber modified asphalt emulsion and a coagulating agent through separate nozzles onto an application surface while they are brought into contact mixing with each other in the air, thereby forming a rubber modified asphalt latter on the application surface.

For instance, reference is made to JP-B 56-48652 and 58-41107. According to the former, a flow of an asphalt latex mixture consisting of asphalt or its mixture with oil and latex, and a flow of mixed emulsion consisting of an aqueous emulsion made up of at least one of asphalt, oil and latex and a gelatinizing agent are sprayed onto an application surface while they are continuously mixed together, thereby forming thereon a rubber modified asphalt layer. According to the latter, an anionic rubber modified asphalt emulsion having a total solid content exceeding 70% by weight (usually 80 to 85% by weight) and a polyvalent metal salt (in the form of a 1–15% by weight aqueous solution, that is a gelatinizing agent, are injected through separate airless type spraying machines onto an application surface while they are brought into contact mixing with each other in the air, thereby forming a rubber modified asphalt layer on the application surface.

Another normal temperature waterproofing method, now available, is of the self-hardening type wherein a hydraulic inorganic material such as cement is used to coagulate a rubber modified asphalt emulsion. This method makes use of the hydration reaction of the hydraulic inorganic material with water present in the rubber modified asphalt emulsion to remove that water as crystal water, thereby forming a rubber modified asphalt layer. The hydraulic inorganic material known to coagulate the rubber modified asphalt emulsion, for instance, is portland cement that may be used alone or in combination with alumina cement, etc.

However, the normal temperature waterproofing method disclosed in JP-B 56-48652 is now found to be quite unpractical, because it, when applied to an upright or slope surface, is likely to cause sagging due to relatively long time it takes the composition to coagulate The normal temperature waterproofing method set forth in JP-B 58-41107, i.e., that of the airless spray type wherein the emulsion is instantaneously coagulated by the co-spraying of a coagulating agent is advantageous in that the exuding amount of water separated by the coagulation of the spraying material is so limited that some considerable improvement is made in the blistering of the formed rubber modified asphalt layer. A problem with this method, however, is that the rubber modified asphalt layer tends to peel off the application surface, if it remains wet, due to the water exuding from the rubber modified asphalt emulsion. Another problem arises due to the fact that the polyvalent metal salt used as the coagulating agent is mainly calcium chloride; that is, the surface of reinforced concrete to which the method has been applied is apt to suffer an attack by salt and rust.

The normal temperature waterproofing method making use of a hydraulic inorganic material such as cement to coagulate a rubber modified asphalt emulsion, when applied to ceilings or walls, has some practical difficulty, because the resulting rubber modified asphalt layer coagulate so slowly that it does not become hard enough within a short time.

Thus, there is a strong demand for the development of a rubber modified asphalt type of waterproofing composition which are free from all the problems of the normal temperature waterproofing methods above mentioned.

SUMMARY OF THE INVENTION

An object of the invention is to meet such demand by the provision of a rubber modified asphalt type of waterproofing composition in which a quite unheard-of organic coagulating agent is used to coagulate a cationic rubber modified asphalt emulsion. The rubber modified asphalt emulsion and organic coagulating agent are injected through a spraying machine onto an application surface, while they are brought into contact and mixed with each other in the air, so that the rubber modified asphalt emulsion can instantaneously coagulate to form a rubber modified asphalt layer having much improved adhesion power even to a wet surface and less amount of exuding water. Furthermore, the composition according to the present invention is free from the problem of a salt attack and rust even when it is applied to the surface of reinforced concrete.

More specifically, the present invention provides a rubber modified asphalt type of waterproofing composition comprising a cationic rubber modified asphalt emulsion and an organic coagulating agent.

The rubber modified asphalt type of waterproofing composition according to the present invention can have a good-enough adhesion even to a wet surface, can be applied to ceilings or walls with no problem, and can provide a waterproofing layer of any desired thickness, because the cationic rubber modified asphalt emulsion and organic coagulating agent are sprayed through an airless or pneumatic type of spraying machine onto an application surface while they are brought into contact mixing with each other in the air, so that the cationic rubber modified asphalt emulsion can be instantaneously decomposed and the modified asphalt coagulated to form a waterproofing layer of rubber modified asphalt on the application surface.

DETAILED DESCRIPTION OF THE INVENTION

The present invention will now be explained in detail.

The term "cationic rubber modified asphalt emulsion" used herein—which is used for the rubber modified asphalt type of waterproofing composition according to the present invention—is understood to refer to a cationic oil-in-water type emulsion wherein rubber particles and asphalt or rubber modified asphalt (that is a modified asphalt obtained by kneading asphalt with rubber and, if required, with a polymer, etc.) particles are dispersed in an aqueous phase with 50 to 70% by weight of residues on evaporation, i.e., 50–70% by weight of solids. The emulsion, when containing less then 50% by weight of residues on evaporation, is not only poor in storage stability, but is also poor in the ability to coagulate instantaneously and therefore the necessary amount of the coagulating agent, and so the amount of exuding water, is increased. When containing more than 70% by weight of residues on evaporation, the emulsion becomes poor in workability, because much difficulty is involved in the addition and mixing of cement to and with it. In the solid content of the cationic rubber modified asphalt emulsion, the ratio of rubber to asphalt lies in the range of 20–50 parts by weight per 100 parts by weight of asphalt. When the rubber is less than 20 parts by weight, no stable yet tough waterproofing layer is obtained, whereas the rubber, when contained in an amount exceeding 50 parts by weight, is not only uneconomical but may also incur deterioration of weather resistance and other properties.

The asphalt materials usable in the present invention include petroleum asphalt such as straight asphalt, semi-blown asphalt, propane-deasphalted asphalt and blown asphalt, and natural asphalt such as lake asphalt, and may be used alone or in combination of two or more. The asphalt used may contain small amounts of oils such as process oil, lubricant, anthracene oil, pine oil, and creosote oil, and aging stabilizers as well.

The rubber materials usable in the present invention include natural rubber, gutta-percha, cyclized rubber, styrene-butadiene rubber, styrene-isoprene rubber, polyisoprene rubber, butadiene rubber, chloroprene rubber, butyl rubber, halogenated butyl rubber, chlorinated polyethylene, chlorosulfonated polyethylene rubber, ethylene-propylene rubber, EPT rubber, alfin rubber, styrene-butadiene block polymer rubber, styrene-isoprene block polymer rubber, etc.

The polymer materials usable in the present invention include ethylene-vinyl acetate copolymers, ethylene-acrylate copolymers, polyethylene, vinyl acetate-acrylate copolymers, etc.

These rubber and polymer materials may have various forms such as powders, latex, emulsion and aqueous forms. The rubber materials may be used alone or in combination of two or more, and may be used in combination with the polymers mentioned above, if required.

The cationic rubber modified asphalt emulsion, for instance, may be prepared in the following manners.

The cationic rubber modified asphalt emulsion may be prepared by adding and mixing a cationic rubber latex to and with a cationic asphalt emulsion such that the rubber to asphalt ratio lies in the range mentioned above. The cationic asphalt emulsion may then be prepared by simultaneously passing an asphalt melted by heating and an emulsified solution obtained by dissolving a cationic surfactant, a stabilizer and the like in warm water (at a temperature of about 50° C.) through an emulsifying machine such as a colloid mill or a harrel homogenizer for mixing and emulsification.

The cationic rubber modified asphalt emulsion may also be prepared by making rubber modified asphalt by kneading an asphalt melted by heating with rubber and optionally a polymer, etc., and emulsifying the rubber modified asphalt in the same manner as mentioned just above.

The cationic surface active agents used for the production of the cationic rubber modified asphalt emulsion include aliphatic or alicyclic mono-, di- or tri-amines having a long-chain alkyl group, amidoamine, polyaminoethylimidazoline, long-chain hydroxyalkyldiamine, and rosin amine, ethylene oxide adducts of these amines, and amine oxides. Water-soluble or dispersible salts obtained by allowing hydrochloric acid, sulfamic acid, acetic acid or the like to act on these amine surfactant may also be used. Quaternary ammonium salts of these amine surfactants may be used as well. These surface active agents may be used in combination with nonionic surface active agents such as polyoxyethylene alkyl ethers, polyoxyethlene alkyl allyl ethers, and hydroxyethylene-hydroxypropylene block copolymers.

The stabilizers used include gelatin, PVA, sodium alginate, starch, carboxymethyl cellulose, etc.

The organic coagulating agents usable in the present invention include an aqueous solution containing an alkyl sulfonate polymer resin, i.e., an aqueous solution of an alkyl sulfonate polymer resin obtained by the polymerization of an alkyl sulfonate monomer or an aqueous solution of a polymer resin obtained by the co-polymerization of an alkyl sulfonate monomer with another monomer, an aqueous solution of an alkylbenzene sulfonate, or an emulsion obtained by the emulsification of an alkyl sulfonate polymer resin and/or an alkylbenzene sulfonate. Sodium polystyrene sulfonate is particularly suited for the polymer resin of an alkyl sulfonate, and sodium dodecylbenzene sulfonate is best suited for the alkylbenzene. These aqueous solution should contain 5 to 50% by weight of the effective ingredient. An aqueous solution containing less than 5% by weight of the effective ingredient contains much more water, and so has an adverse influence on the adhesion and water resistance of the resulting waterproofing layer. An aqueous solution containing more than 50% by weight of the effective ingredient is not only uneconomical but also has an adverse influence on spraying due to its too high viscosity.

The cement materials to be added to and mixed with the cationic rubber modified asphalt emulsion include normal portland cement, high early strength portland cement, super high early strength portland cement, moderate heat cement, white portland cement, blast furnace portland cement, silica cement, fry ash cement, alumina cement, expansive cement, sulfate resistive cement, jet cement, super rapid hardening cement, blast furnace colloid cement, colloid cement, ultrafine cement, etc., which may be used alone or in combination of two or more.

The cement reacts to hydrate with water in the cationic rubber modified asphalt emulsion to absorb the water as crystal water, and so the cement is effective for reducing the amount of water exuding from the formed waterproofing layer. The cement should be added to the cationic rubber modified asphalt emulsion in an amount of 0 to 100 parts by weight per 100 parts by weight of the cationic rubber modified asphalt emulsion. In some cases, the cationic rubber modified asphalt emulsion may contain no cement. A liquid mixture of 100 parts by weight of the cationic rubber modified asphalt emulsion and more than 100 parts by weight of cement, on the other hand, becomes difficult to be handled due to its reduced pot life.

The fiber materials usable in the present invention include synthetic fibers such as glass fibers, rayon silk, vinylon, saran, polypropylene, polyester, polyamide and polyimide, carbon fibers, etc. In required, steel fibers may be used as well.

The rubber modified asphalt type of waterproofing composition according to the present invention is obtained by:

(1) spraying the cationic rubber modified asphalt emulsion and the organic coagulating agent substantially at the same time through a spraying machine onto an application surface while they are brought into contact and mixed with each other in the air, whereby a waterproofing layer is formed thereon;

(2) spraying a liquid mixture obtained by adding and mixing cement to the cationic rubber modified asphalt emulsion and the organic coagulating agent substantially at the same time through a spraying machine onto an application surface while they are brought into contact and mixed with each other in the air, whereby a waterproofing layer is formed thereon;

(3) spraying the cationic rubber modified asphalt emulsion, the fiber, and the organic coagulating agent substantially at the same time through a spraying machine onto an application surface while they are brought into contact and mixed with each other in the air, whereby a waterproofing layer is formed thereon; and (4) spraying a liquid mixture obtained by adding and mixing cement to the cationic rubber modified asphalt emulsion, the fiber, and the organic coagulating agent substantially at the same time through a spraying machine onto an application surface while they are brought into contact and mixed with each other in the air, whereby a waterproofing layer is formed thereon.

The spraying machine usable in the present invention may be of either the air spray type or the airless type. Generally, spraying is achieved by use of a spraying gun provided with two or three separate nozzles (or heads), through which the cationic rubber modified asphalt emulsion or its liquid mixture with cement, and the coagulating agent are sprayed almost simultaneously. In the case of the two-nozzle system, the cationic rubber modified asphalt emulsion or its mixture with cement is sprayed from one nozzle while the coagulating agent is sprayed from the other nozzle. In the case of the three-nozzle system, the cationic rubber modified asphalt emulsion or its liquid mixture with cement is sprayed from one nozzle while the coagulating agent is sprayed from the other two nozzles. The fibers may be sprayed, almost simultaneously with the spraying of the coagulating agent, etc., using a separately provided, exclusive spraying machine. For instance, a chopper gun may be used in the direct spray method that is one example of GRC production to cut the fiber (roving) to a given length and, almost at the same time, spray it. As a matter of course, the fibers can be added to and mixed with the cationic rubber modified asphalt emulsion before spraying.

Set out below are typical ratios of the materials used for obtaining the rubber modified asphalt type of waterproofing composition according to the present invention.

(1) The amount of the effective ingredient in the coagulating agent is 0.4 to 10 parts by weight per 100 parts by weight of the cationic rubber modified asphalt emulsion. When the coagulating agent contains less than 0.4 parts by weight of the effective ingredient, the composition is poor in the ability to coagulate instantaneously, and when the coagulating agent contains more than 10 parts by weight of the effective ingredient, the resulting waterproofing layer becomes rather poor in water resistance.

(2) The amount of the effective ingredient in the coagulating agent is 0.1 to 10 parts by weight per 100 parts by weight of a liquid mixture obtained by adding and mixing up to 100 parts by weight of cement to and with 100 parts by weight of the cationic rubber modified asphalt emulsion. When the amount of the effective ingredient in the coagulating agent is less than 0.1 part by weight, the composition is poor in the ability to coagulate instantaneously. When the amount of the effective ingredient in the coagulating agent exceeds 10 parts by weight, the resultant waterproofing layer rather becomes poor in water resistance.

(3) Per 100 parts by weight of the cationic rubber modified asphalt emulsion, the amount of the fibers is 0.1 to 5 parts by volume and the amount of the effective ingredient in the coagulating agent is 0.4 to 10 parts by weight. If the amount of the fibers is less than 0.1 part by volume, it will then be impossible to form the resultant waterproofing layer having good-enough weather resistance and durability. If the amount of the fibers exceeds 5 parts by volume, it will then be difficult to form the waterproofing layer itself. When the amount of the effective ingredient in the coagulating agent is less than 0.4 parts by weight, the composition is poor in the ability to coagulate instantaneously. When the amount of the effective ingredient in the coagulating agent is more than 10 parts by weight, there is a risk of increasing the amount of exuding water.

(4) Per 100 parts by weight of a liquid mixture obtained by adding and mixing up to 100 parts by weight of cement to and with 100 parts by weight of the cationic rubber modified asphalt emulsion, the amount of the fibers is 0.1 to 5 parts by volume and the amount of the effective ingredient in the coagulating agent is 0.1 to 10 parts by weight. If the amount of the fibers is less than 0.1 part by volume, it will then be unlikely to form the end waterproofing layer having good-enough weather resistance and durability. If the amount of the fibers exceeds 5 parts by volume, it will then be rather difficult to form the waterproofing layer itself. When the amount of the effective ingredient in the coagulating agent is less than 0.1 part by weight, the composition is poor in the ability to coagulate instantaneously. When the amount of the effective ingredient in the coagulating agent is more than 10 parts by weight, there is a risk of increasing the amount of exuding water.

The features of the present invention will now be explained at great length with reference to experiment runs and examples.

MATERIALS USED

1) Cationic Rubber Modified Asphalt Emulsion (Nichireki Chemical Industry Co.,Ltd.)

Twenty (20) parts by weight of styrene-butadiene rubber and 10 parts by weight of a styrone-isoprene block copolymer rubber were added to and mixed with 70 parts by weight of straight asphalt (with a penetration of 150 to 200) melted by heating for kneading to prepare rubber asphalt. This rubber modified asphalt was then emulsified with the use of a cationic surface active agent be obtain a cationic rubber modified asphalt emulsion (with 70% by weight of residues remaining after evaporation), which will hereinafter be simply called the rubber modified asphalt emulsion.

2) Alkyl Sulfonate Polymer Resin (Toho Natural Gas Co., Ltd.)

A 25% by weight aqueous solution of an alkyl sulfonate polymer resin obtained by the polymerization of sodium styrone sulfonate with the use of a water-soluble polymerization initiator (which will hereinafter be simply called the coagulating agent A).

Alkylbenzene Sulfonate (Kao Soap Co., Ltd.)

Neopelex F-65 (Kao Soap Co., Ltd.) or a 65 % by weight aqueous solution of sodium dodecylbenzene sulfonate was used to make an aqueous solution containing 10% by weight of sodium dodecylbenzene sulfonate (which will hereinafter be simply called the coagulating agent B).

4) Cement (Commercially available) normal portland cement.

5) Fibers (Vinylon Fibers)

Kuratech (Kuraray Co., Ltd.).

EXPERIMENT 1

To examine the amount of cement added to the rubber modified asphalt emulsion, experimentation was done in terms of the pot life of cement. More specifically, the viscosity of liquid mixtures consisting of a given amount of the rubber modified asphalt emulsion and varying amounts of cement was measured with the use of a Brookfield Rotational viscometer. Mixing was carried out using a stirrer (RD20DZM, IKA-WERK) with a turbine blade at about 500 rpm. After the lapse of the pot life of 2 hours, the viscosity of the mixtures was measured. Mixtures having a viscosity of up to 10,000 cps were estimated as acceptable. Continuous mixing occurred for 2 hours, and measurements were taken at room temperature (25° C.). The results of experimentation are shown in Table 1.

TABLE 1

Amount of Cement and Viscosity

| Experiment Run | 1 | 2 | 3 | 4 | 5 | 6 | 7 | 8 |
|---|---|---|---|---|---|---|---|---|
| Amount of RAE (pbw) | 100 | 100 | 100 | 100 | 100 | 100 | 100 | 100 |
| Amount of Cement (pbw) | 0 | 20 | 40 | 60 | 80 | 100 | 120 | 140 |
| Vis. after 1 min. (cps) | 275 | 440 | 620 | 900 | 1500 | 3000 | 12500 | * |
| Vis. after 2 hr. (cps) | 290 | 440 | 640 | 1002 | 2000 | 3600 | 14000 | ** |
| Estimation | o | o | o | o | o | o | x | x |

RAE: Rubber Modified Asphalt Emulsion
*: Gelation
**: Immeasurable

EXPERIMENT 2

To make investigation of how the ability to coagulate instantaneously of some compositions is changed depending on a variation in the amount of coagulating agent added to the rubber modified asphalt emulsion, experimentation was carried out in the following procedure. A given amount of the rubber modified asphalt emulsion or liquid mixtures of the rubber modified asphalt emulsion and cement were mixed with varying amounts of the coagulating agent to make visual observation of the time taken until gelation occured. More specifically, mixing was carried out using the same stirrer as in Experiment 1 at about 500 rpm. Under this condition the rubber modified asphalt emulsion was mixed with the cement for about one minute. After the addition of the coagulating agent, the time elapsed up to the time gelation occurred was visually measured. When cement was used (see Tables 3 and 4), this experiment was conducted at a constant rubber modified asphalt emulsion-to-cement ratio, with the amount of the cement kept constant at 100 parts by weight that is the upper limit in Experiment 1. That is, the quantitative rubber modified asphalt emulsion-to-cement ratio was 50 parts by weight to 50 parts by weight. The time was measured at room temperature (25° C.). The results of experimentation are shown in Tables 2,3,4 and 5.

TABLE 2

Amount of Coagulating Agent and the Ability to Coagulate Instantaneously (1)

| Experiment Run | 1 | 2 | 3 | 4 | 5 | 6 | 7 | 8 |
|---|---|---|---|---|---|---|---|---|
| Amount of RAE (pbw) | 100 | 100 | 100 | 100 | 100 | 100 | 100 | 100 |
| Amount of CAA (pbw) | 2 | 4 | 6 | 10 | 15 | 20 | 30 | 40 |
| First GT (sec.) | * | * | 6 | 5 | 4 | 3 | 3 | 3 |
| Second GT (sec.) | * | * | 6 | 5 | 3 | 4 | 3 | 3 |
| Average | * | * | 6 | 5 | 4 | 4 | 3 | 3 |

RAE: Rubber Modified Asphalt Emulsion
CAA: Coagulating Agent A
GT: Gelling Time
*: Gelling time exceeding 5 minutes

TABLE 3

Amount of Coagulating Agent and the Ability to Coagulate Instantaneously (2)

| Experiment Run | 1 | 2 | 3 | 4 | 5 | 6 | 7 | 8 |
|---|---|---|---|---|---|---|---|---|
| Amount of RAE (pbw) | 50 | 50 | 50 | 50 | 50 | 50 | 50 | 50 |
| Amount of Cement (pbw) | 50 | 50 | 50 | 50 | 50 | 50 | 50 | 50 |
| Amount of CAA (pbw) | 1 | 2 | 3 | 10 | 15 | 20 | 30 | 40 |
| First GT (sec.) | * | 3 | 3 | 3 | 3 | 3 | 3 | 3 |
| Second GT (sec.) | * | 3 | 3 | 3 | 3 | 3 | 3 | 3 |
| Average | * | 3 | 3 | 3 | 3 | 3 | 3 | 3 |

RAE: Rubber Modified Asphalt Emulsion
CAA: Coagulating Agent A
GT: Gelling Time
*: Gelling time exceeding 5 minutes

TABLE 4

Amount of Coagulating Agent and
the Ability to Coagulate Instantaneously
(3)

| Experiment Run | 1 | 2 | 3 | 4 | 5 | 6 | 7 | 8 |
| --- | --- | --- | --- | --- | --- | --- | --- | --- |
| Amount of RAE (pbw) | 100 | 100 | 100 | 100 | 100 | 100 | 100 | 100 |
| Amount of CAB (pbw) | 0.4 | 1 | 2 | 3 | 4 | 6 | 8 | 10 |
| First GT (sec.) | * | * | 160 | 25 | 8 | 7 | 4 | 4 |
| Second GT (sec.) | * | * | 170 | 28 | 8 | 7 | 4 | 4 |
| Average | * | * | 165 | 27 | 8 | 7 | 4 | 4 |

RAE: Rubber Modified Asphalt Emulsion
CAB: Coagulating Agent B
GT: Gelling Time
*: Gelling time exceeding 5 minutes

TABLE 5

Amount of Coagulating Agent and
the Ability to Coagulate Instantaneously
(4)

| Experiment Run | 1 | 2 | 3 | 4 | 5 | 6 | 7 | 8 |
| --- | --- | --- | --- | --- | --- | --- | --- | --- |
| Amount of RAE (pbw) | 50 | 50 | 50 | 50 | 50 | 50 | 50 | 50 |
| Amount of Cement (pbw) | 50 | 50 | 50 | 50 | 50 | 50 | 50 | 50 |
| Amount of CAB (pbw) | 0.2 | 0.5 | 1 | 2 | 4 | 6 | 8 | 10 |
| First GT (sec.) | * | * | 3 | 3 | 3 | 3 | 3 | 3 |
| Second GT (sec.) | * | * | 3 | 3 | 3 | 3 | 3 | 3 |
| Average | * | * | 3 | 3 | 3 | 3 | 3 | 3 |

RAE: Rubber Modified Asphalt Emulsion
CAB: Coagulating Agent B
GT: Gelling Time
*: Gelling time exceeding 5 minutes The results of Experiments 1 and 2 teach the following.

1) When more than 100 parts by weight of the cement are added to 100 parts by weight of the rubber modified asphalt emulsion, the composition has a pot life less than 2 hours, and so has some difficulty in smooth spraying.

2) When less than 6 parts by weight of coagulating agent A are added to 100 parts by weight of the rubber modified asphalt emulsion, the composition has a long gelling time (in seconds), and so is expected to be incapable of coagulating instantaneously. Thirty (30) parts by weight of coagulating agent A, on the other hand, make the gelling time (in seconds) of the composition short, and so has some considerable effect on instantaneous coagulation of the composition, but that effect remains unchanged even at more than 30 parts by weight. Moreover, much water exuded from the waterproofing layer at more than 40 parts by weight.

3) When less than 2 parts by weight of coagulating agent A are added to 100 parts by weight of a liquid mixture of the rubber modified asphalt emulsion and cement, the composition has a long gelling time (in seconds), and so is expected to be incapable of coagulating instantaneously. Two (2) parts by weight of coagulating agent A, on the other hand, makes the gelling time (in seconds) of the composition short, and so has some considerable effect on instantaneous coagulation of the composition, but that effect remains unchanged even at more than 2 parts by weight. Moreover, much water exuded from the waterproofing layer at more than 40 parts by weight.

4) When less than 4 parts by weight of coagulating agent B are added to 100 parts by weight of the rubber modified asphalt emulsion, the composition takes long to gel (in seconds), and so is expected to be incapable of coagulating instantaneously. Eight (8) parts by weight of coagulating agent B, on the other hand, make the gelling time (in seconds) of the composition short, and so has some considerable effect on instantaneous coagulation of the composition, but that effect remains unchanged even at more than 8 parts by weight.

5) When less than 1 part by weight of coagulating agent B is added to 100 parts by weight of a liquid mixture of the rubber modified asphalt emulsion and cement, the composition has a long gelling time (in seconds) and so is expected to be incapable of coagulate instantaneously. One (1) part by weight of coagulating agent B, on the other hand, makes the gelling time (in seconds) of the composition short, and so has some considerable effect of instantaneous coagulation of the composition, but that effect remains unchanged even at more than 1 part by weight.

EXAMPLE 1

While the results of Experiments 1 and 2 are taken into account, eight compositions shown in Table 6 were sprayed through a spray gun onto the dry and wet surface portions of upright slate plate walls. The rubber modified asphalt emulsion was used in an amount of about 6.3 kg/m$^2$ or at such a proportion that the resulting waterproofing layer had a thickness of about 5 mm. to be understood that vinylon rovings, as a fiber, were cut to about 30 mm by means of a chopper gun and sprayed onto the walls almost simultaneously with the rubber modified asphalt emulsion and coagulating agent.

It was consequently found that all the compositions are so excellent in the ability to coagulate instantaneously that even when they are sprayed onto the dry and wet surface portions of the upright walls, they can be well bonded to both the surface portions with no sagging at all. Any amount of water did not substantially exude from the waterproofing layers, when the compositions contained cement. Even after the lapse of about six months from exposure, the waterproofing layers were found to be in the same good-enough condition as just after spraying with neither blistering nor sagging.

For the purpose of comparison, without accident of use coagulating agent, 100 parts by weight of the rubber modified asphalt emulsion and 60 parts by weight of jet cement (Onoda Cement Co., Ltd.) were used to carry out spraying experimentation according to the procedure of Example 1. The result was that the waterproofing layer sagged and displaced while it was under spraying, and therefore, it was quite impossible to spray such a composition onto an upright wall surface.

In another comparative experimentation, 100 parts by weight of an anionic rubber modified asphalt emulsion (with 70% by weight of residues upon evaporation which had a rubber content of 30% by weight) and a coagulating agent, i.e., a 7% by weight aqueous solution of calcium chloride, were used as in Example 1. It was consequently found that the composition was capable of coagulating instantaneously with no sagging, but much water exuded from the waterproofing layer. Moreover, after the lapse of about six months from exposure, the waterproofing layer blistered and peeled off partly. It is here noted that an attempt to prevent water exudation by the incorporation of cement into the composition ended in failure.

The physical properties of these eight rubber modified asphalt type of waterproofing compositions were examined according to JIS 6021 laid down on rubber modified asphalt. The results are also set out in Table 6 for the purpose of comparison with the reference values according to JIS 6021. As can be seen from Table 6, all the rubber modified asphalt type of waterproofing compositions have good-enough physical properties conforming to the reference values according to JIS 6021.

6) The present rubber modified asphalt type of waterproofing composition, because of containing an organic coagulating agent, is quite free from the problem of salt attack and rust on the reinforced concrete surface sprayed by the composition.

7) Even when exposed to a rainfall just after having been sprayed, the present rubber modified asphalt type of water-

TABLE 6

Proportion and Results of Physical Properties Measured

| Proportion | | 1 | 2 | 3 | 4 | 5 | 6 | 7 | 8 | Reference Values * |
|---|---|---|---|---|---|---|---|---|---|---|
| Amount of RAE (pbw) | | 100 | 100 | 100 | 100 | 100 | 100 | 100 | 100 | |
| Amount of Cement | | 40 | 40 | — | — | 40 | 40 | — | — | |
| Amount of CAA (pbw) | | 10 | 10 | 15 | 15 | — | — | — | — | |
| Amount of CAB (pbw) | | — | — | — | — | 6 | 6 | 10 | 10 | |
| Amount of Fiber (pbv) | | — | 0.25 | — | 0.25 | — | 0.25 | — | 0.25 | |
| Tensile Strength | 20° C. | 7.5 | 7.0 | 4.0 | 5.0 | 6.5 | 6.5 | 4.0 | 4.2 | 3.5 or more |
| (Kgf/cm$^2$) | −20° C. | 58.5 | 52.5 | 32.0 | 42.0 | 49.4 | 49.0 | 29.0 | 36.0 | — |
| Specific Tensile Strength (%) (−20° C./20° C.) | | 780 | 750 | 800 | 840 | 760 | 750 | 830 | 860 | 700–1000 |
| Elongation at | 20° C. | 760 | 700 | 2000 or more | 2000 or more | 1630 | 1340 | 2000 or more | 2000 or more | 600 or more |
| Break (%) | −20° C. | 130 | 80 | 470 | 110 | 260 | 90 | 360 | 140 | 70 or more |
| Bonding Strength ** (Kgf/cm$^2$) | | 6.3 | 5.9 | 5.3 | 5.5 | 5.5 | 4.9 | 3.5 | 3.5 | — |

*: Reference Values According to JIS A 6021
**: Bonding Strength Testing According to the Kenken Testing Method The above constructions of the present invention has the following advantages.

1) When the present rubber modified asphalt type of waterproofing composition comprising a rubber modified asphalt emulsion and an organic coagulating agent is sprayed onto an application surface through an airless or air type of spraying machine, the emulsion and the coagulating agent are brought into contact and mixed with each other in the air, so that the emulsion can be instantaneously decomposed and the rubber modified asphalt coagulated to form a waterproofing layer on the application surface. Thus, the waterproofing layer can be well bonded even to a wet surface or to a ceiling or an upright surface (of a wall, for instance) with neither sagging nor displacement.

2) The present rubber modified asphalt type of waterproofing composition is capable of coagulating so instantaneously that it can rapidly provide a rubber modified asphalt type of waterproofing layer, the thickness of which can arbitrarily be varied.

3) When the present rubber modified asphalt type of waterproofing composition additionally contains cement, it is possible to achieve a waterproofing layer that is most unlikely to blister due to no substantial amount of water exudation, because the cement absorbs the water content of the rubber modified asphalt emulsion in the form of crystal water.

4) When the present rubber modified asphalt type of waterproofing composition additionally contains fibers, it is possible to achieve a waterproofing layer that is more improved in terms of weather resistance, water resistance, and durability.

5) The present rubber modified asphalt type of waterproofing composition, because of being excellent in such physical properties as tensile strength, elongation, and bonding strength, can easily follow the complicated behavior of an application surface, so that it can provide a waterproofing layer that is well bonded to the application surface.

proofing composition is unlikely to flow out; it can surely be sprayed onto an application surface over a reduced period of time.

The rubber modified asphalt type of waterproofing composition according to the present invention, because of having such advantages as mentioned above, can be used not only for the purpose of waterproofing every part of a building, e.g., the roof, underground walls, floor and water tank, but also for subways, public waterways, underground passages, irrigation channels, reservoirs, water supply and drainage installations, banks, dams, bridges, and the like.

That which is claimed is:

1. A rubber modified asphalt waterproofing composition consisting essentially of a liquid mixture of cement, a cationic rubber modified asphalt emulsion of 50–70% by weight solids and 20–50 parts by weight of rubber per 100 parts by weight of asphalt, and an amount effective to coagulate said asphalt emulsion of an organic coagulating agent selected from the group consisting of an aqueous solution or emulsion of an alkyl sulfonate polymer resin, an aqueous solution or emulsion of sodium dodecylbenzene sulfonate, and an emulsion obtained by the emulsification of an alkyl sulfonate polymer resin together with an alkylbenzene sulfonate, the organic coagulating agent comprising 5–50% by weight of the aqueous solution or emulsion.

2. A rubber modified asphalt according to claim 1 wherein said organic coagulating agent is an aqueous solution or emulsion of an alkyl sulfonate polymer resin.

3. A rubber modified asphalt according to claim 1 wherein the organic coagulating agent is a an aqueous solution or emulsion of sodium dodecyl benzene sulfonate.

4. A rubber modified asphalt according to claim 1 wherein the organic coagulating agent is a an emulsion obtained by the emulsification of an alkyl sulfonate polymer resin together with an alkyl benzene sulfonate.

5. A rubber modified asphalt composition according to claim 1, wherein the amount of organic coagulating agent effective to coagulate the asphalt emulsion comprises 0.1–10 parts by weight per 100 parts by weight of a mixture of the cationic rubber modified asphalt emulsion and cement.

6. A rubber modified asphalt waterproofing composition consisting essentially of a cationic rubber modified asphalt emulsion of 50–70% by weight solids and 20–50 parts by weight of rubber per 100 parts by weight of asphalt, 0.1 to 5 parts by volume of fibers, and an amount effective to coagulate the asphalt emulsion of an organic coagulating agent selected from the group consisting of an aqueous solution or emulsion of an alkyl sulfonate polymer resin, an aqueous solution or emulsion of sodium dodecylbenzene sulfonate, and an emulsion obtained by the emulsification of an alkyl sulfonate polymer resin together with an alkylbenzene sulfonate, the organic coagulating agent comprising 5–50% by weight of the aqueous solution or emulsion.

7. A rubber modified asphalt according to claim 6, wherein the organic coagulating agent is a an aqueous solution or emulsion of an alkyl sulfonate polymer resin.

8. A rubber modified asphalt according to claim 6 wherein the organic coagulating agent is a an aqueous solution or emulsion of sodium dodecyl benzene sulfonate.

9. A rubber modified asphalt according to claim 6 wherein the organic coagulating agent is a an emulsion obtained by the emulsification of an alkyl sulfonate polymer resin together with an alkyl benzene sulfonate.

10. A rubber modified asphalt composition according to claim 6, wherein the amount of organic coagulating agent effective to coagulate the asphalt emulsion comprises 0.4 to 10 parts by weight per 100 parts by weight of the cationic rubber modified asphalt emulsion.

11. A rubber modified asphalt waterproofing composition consisting essentially of a liquid mixture of cement, a cationic rubber modified asphalt emulsion of 50–70% by weight solids and 20–50 parts by weight of rubber per 100 parts by weight of asphalt, 0.1 to 5 parts by volume of fibers, and an amount effective to coagulate the asphalt emulsion organic coagulating agent selected from the group consisting of an aqueous solution or emulsion of an alkyl sulfonate polymer resin, an aqueous solution or emulsion of an alkyl benzene sulfonate, and an emulsion obtained by the emulsification of an alkyl sulfonate polymer resin together with an alkylbenzene sulfonate, the organic coagulating agent comprising 5–50% by weight of the aqueous solution or emulsion.

12. A rubber modified asphalt according to claim 11 wherein the organic coagulating agent is a an emulsion obtained by the emulsification of an alkyl sulfonate polymer resin together with an alkyl benzene sulfonate.

13. A rubber modified asphalt according to claim 11, wherein the organic coagulating agent is an aqueous solution or emulsion of sodium dodecyl benzene sulfonate.

14. A rubber modified asphalt according to claim 11, wherein the organic coagulating agent is an aqueous solution or emulsion of an alkyl sulfonate polymer resin.

15. A rubber modified asphalt composition according to claim 11, wherein the amount of organic coagulating agent effective to coagulate the asphalt emulsion comprises 0.1–10 parts by weight per 100 parts by weight of a mixture of the cationic rubber modified asphalt emulsion and cement.

* * * * *